(12) United States Patent
Aghdaie et al.

(10) Patent No.: US 11,161,044 B2
(45) Date of Patent: *Nov. 2, 2021

(54) ADAPTIVE GAMING TUTORIAL SYSTEM

(71) Applicant: Electronic Arts Inc., Redwood City, CA (US)

(72) Inventors: Navid Aghdaie, San Jose, CA (US); John Kolen, Half Moon Bay, CA (US); Mohamed Marwan Mattar, San Francisco, CA (US); Mohsen Sardari, Redwood City, CA (US); Su Xue, Fremont, CA (US); Kazi Atif-Uz Zaman, Foster City, CA (US)

(73) Assignee: ELECTRONICS ARTS INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,563

(22) Filed: May 6, 2019

(65) Prior Publication Data
US 2019/0358545 A1 Nov. 28, 2019

Related U.S. Application Data

(63) Continuation of application No. 15/077,797, filed on Mar. 22, 2016, now Pat. No. 10,279,264.

(51) Int. Cl.
*A63F 13/67* (2014.01)
*A63F 13/5375* (2014.01)
*A63F 13/285* (2014.01)

(52) U.S. Cl.
CPC ............ *A63F 13/67* (2014.09); *A63F 13/285* (2014.09); *A63F 13/5375* (2014.09); *A63F 2300/5533* (2013.01)

(58) Field of Classification Search
None
See application file for complete search history.

(56) References Cited

U.S. PATENT DOCUMENTS

| | | | |
|---|---|---|---|
| 6,966,832 B2 | 11/2005 | Leen et al. | |
| 8,882,582 B2 | 11/2014 | Avent et al. | |
| 2003/0109305 A1 | 6/2003 | Gavin et al. | |
| 2005/0246638 A1 | 11/2005 | Whitten | |

(Continued)

OTHER PUBLICATIONS

Suddaby, Paul, "The Many Ways to Show the Player How It's Done With In-Game Tutorials," published Aug. 31, 2012, available at https://gamedevelopment.tutsplus.com/tutorials/the-many-ways-to-show-the-player-how-its-done-with-in-game-tutorials--gamedev-400, last accessed Jun. 20, 2018.

*Primary Examiner* — Jay Trent Liddle
(74) *Attorney, Agent, or Firm* — Knobbe, Martens, Olson & Bear, LLP

(57) ABSTRACT

Embodiments of the present disclosure provide a tutorial system that can aid a user in performing various game commands in response to different game states in a virtual game environment. As the user plays the game, various game states may be encountered. A tutorial engine may, based on a current game state, determine one or more game commands to be recommended to the user, based on historical information of the user and a game state model, wherein the game state model maintains associations between game states and different segments of users. The user is recommended relevant game commands during the normal course of gameplay, based on their own gameplay history and on game commands commonly performed by other users of the game application.

18 Claims, 11 Drawing Sheets

(56) References Cited

U.S. PATENT DOCUMENTS

| | | |
|---|---|---|
| 2007/0157093 A1 | 7/2007 | Karcher |
| 2007/0195059 A1 | 8/2007 | Shahoian et al. |
| 2008/0148165 A1 | 6/2008 | Zalewski |
| 2009/0063463 A1 | 3/2009 | Turner et al. |
| 2010/0041475 A1 | 2/2010 | Zalewski et al. |
| 2013/0005471 A1 | 1/2013 | Chung et al. |
| 2013/0116022 A1 | 5/2013 | Davison et al. |
| 2016/0317933 A1 | 11/2016 | Shoshan |

ADAPTIVE GAMING TUTORIAL SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

When playing a new game, an obstacle for new players can be learning the controls for the game. If a user is not familiar with the game's controls, the user's adoption, retention, and overall enjoyment of the game can be negatively affected. In order to alleviate this problem, some games offer tutorials for a new player to undergo, typically at the start of the game. Tutorials are often offered to each player irrespective of their skill level or prior experience. This one size fits all approach means that the tutorials can be too difficult for beginners or too simple for advanced players. This may cause many players to skip the tutorials or not become familiar with different skill sets used in playing the game.

SUMMARY OF SOME EMBODIMENTS

The systems, methods, and devices of this disclosure each have several innovative aspects, no single one of which is solely responsible for the all of the desirable attributes disclosed herein.

One embodiment discloses a computer-implemented method comprising as implemented by an interactive computing system configured with specific computer-executable instructions during runtime of a game application, receiving, from a client computing device, game state information associated with a character in a game environment of the game application, wherein the character is associated with a user playing the game application on the client computing device; accessing a character model corresponding to the user, wherein the character model includes historical data associated with previous game commands performed by the user at one or more game states; identifying a game state within a game state model based, at least in part, on the game state information, wherein the game state is associated with at least one game command; identifying a segment associated with the user, based at least in part on the character model and the game state model; identifying at least one game command associated with the identified segment; generating a tutorial information data package comprising instructions to implement a tutorial for performing the least one game command within the game environment; and transmitting, to the client computing device, the tutorial information the data package.

Another embodiment discloses a system comprising: an electronic data store configured to store a game state model and a character model associated with a game application; a hardware processor in communication with the electronic data store, the hardware processor configured to execute specific computer-executable instructions during runtime of a game application to at least: receive game state information associated with a character in a game environment of the game application from a client computing device, wherein the character is associated with a user playing the game application on the client computing device; access a character model corresponding to the user, wherein the character model includes historical data associated with previous game commands performed by the user at one or more game states; identify a game state within a game state model based, at least in part, on the game state information, wherein the game state is associated with at least one game command; identify a segment associated with the user based, at least in part, on the character model and the game state model; identify at least one game command associated with the selected segment; generate a tutorial information data package comprising instructions to implement a tutorial for performing the least one game command within the game environment; and transmit the tutorial information data package to the client computing device.

Another embodiment discloses a non-transitory computer-readable storage medium storing computer executable instructions that, when executed by one or more computing devices, configure the one or more computing devices to perform operations comprising: receiving, from a client computing device, game state information associated with a character in a game environment of a game application, wherein the character is associated with a user playing the game application on the client computing device; accessing a character model corresponding to the user, wherein the character model includes historical data associated with previous game commands performed by the user at one or more game states; identifying a game state within a game state model based, at least in part, on the game state information, wherein the game state is associated with at least one game command; identifying a segment associated with the user based, at least in part, on the character model and the game state information; identifying at least one game command associated with the selected segment; generating a tutorial information data package comprising instructions to implement a tutorial for performing the least one game command within the game environment; and transmitting, to the client computing device, the tutorial information data package during runtime of the game application.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF SOME EMBODIMENTS

Overview

Figure 1:
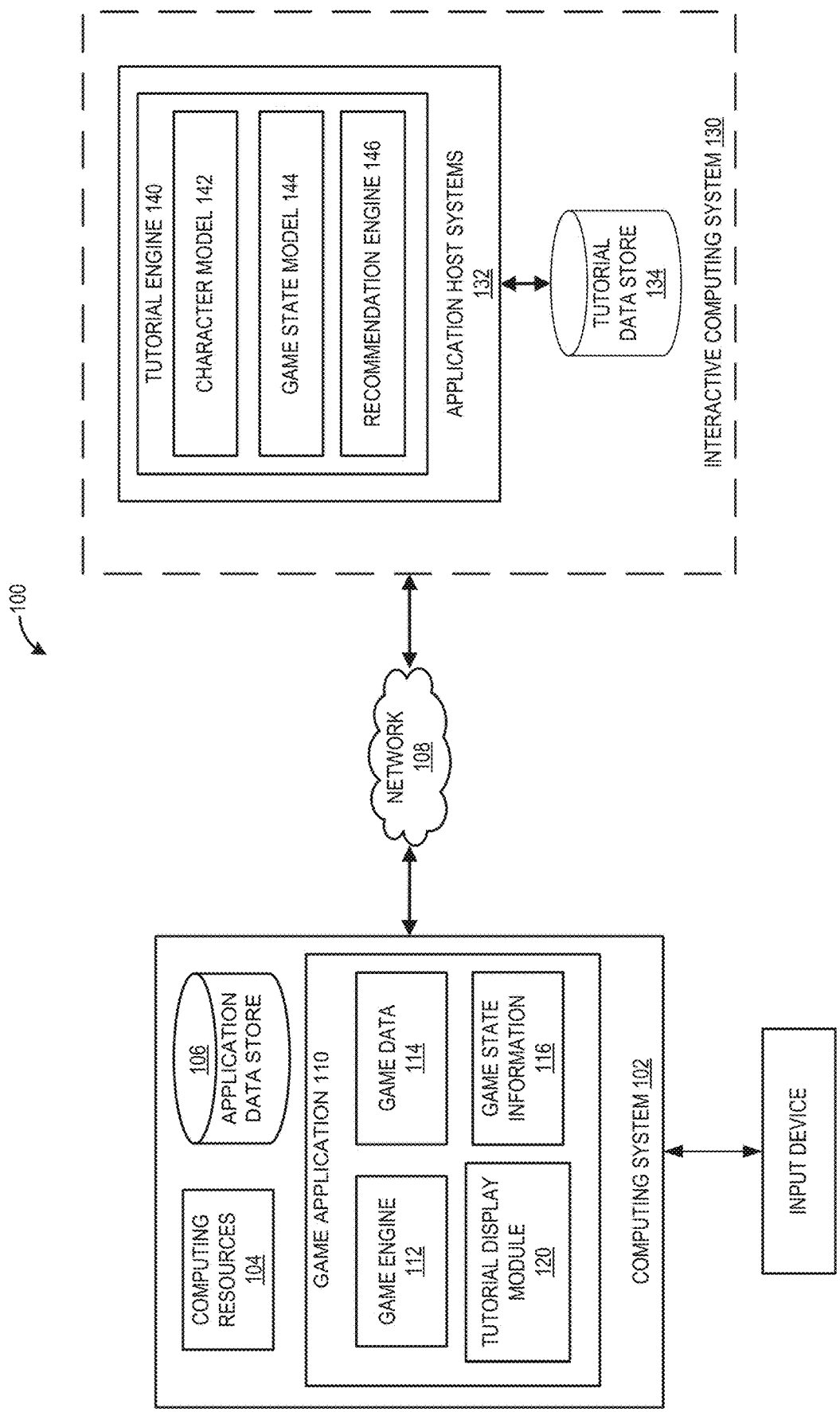
FIG. 1 illustrates an embodiment of a computing environment for implementing a tutorial engine for a game application.

In some embodiments, in order to increase player engagement and retention, an intelligent and adaptive tutorial system may be used that provides a user with automated guidance on how to perform in-game commands, functions, or techniques (hereinafter collectively referred to as "moves") during the normal course of gameplay within a game application.

As a user plays a game, the user controls an entity within the game application (hereinafter referred to as a "character") that may enter different game states where certain types of moves can be performed. In some embodiments, a tutorial engine can be used to determine the types of moves that can be performed at game states within a game environment. In some embodiments, the user's past behavior may be used to assess whether or not guidance associated with one or more of moves should be provided to the player. For example, the tutorial engine can provide to the user guidance on advanced moves or moves that the user is unfamiliar with, while not providing guidance on moves that the user has been able to perform consistently in the past.

In addition, historical information for users of the game application may be collected to construct a model indicating which moves are typically performed by different users when encountering a particular game state. This allows the tutorial system to dynamically reflect the preferred moves and strategies of the game's users.

Users may be presented with the tutorial information during the normal course of gameplay. Through the use of a character model and a game state model, the recommendations presented to the user can be tailored to the user's level of skill and/or playstyle. For example, the user can be presented with tutorial information corresponding to moves that the user has not yet mastered in gameplay, while information for moves that the user has already been able to perform successfully are not presented, thus avoiding distracting the user with information the user will not find useful. The user can learn by example, by being prompted to perform the move at the appropriate time during the course of normal gameplay when it would be of most use. In some embodiments, tutorial information may be provided to the user when the user is playing the game in a tutorial mode, when the user is playing the game against a computer opponent, or when the user is playing the game online (for example, with other human users). In some embodiments, the character model and/or the game state model can be generated using machine learning techniques and algorithms.

For purposes of this disclosure the term "user" can refer to a person that is operating a computing device in order to control the operation of a game application (for example, to play the game). For purposes of this disclosure the term "character" can refer to an entity such as a virtual avatar or character that a user can control within a game application. The character can correspond to a person, vehicle, object, and/or any entity that the user can control within the game application.

Overview of Video Game Environment

FIG. 1 illustrates an embodiment of a computing environment 100 for implementing a tutorial engine for a game application. The environment 100 includes a network 108, a user computing system 102, and an interactive computing system 130, which includes application host systems 132, and a tutorial data store 134. To simplify discussion and not to limit the present disclosure, FIG. 1 illustrates only one user computing system 102 and one interactive computing system 130, though multiple systems may be used. The user computing system 102 may communicate via a network 108 with the interactive computing system 130. Although only one network 108 is illustrated, multiple distinct and/or distributed networks 108 may exist.

Computing System

The computing system 102 includes computing resources 104 and an application data store 106. The user computing system 102 may include any type of computing system. For example, the user computing system 102 may be any type of computing device, such as a desktop, laptop, video game platform/console, television set-top box, television (for example, Internet TVs), network-enabled kiosk, car-console device, computerized appliance, wearable device (for example, smart watches and glasses with computing functionality), wireless mobile devices (for example, smart phones, personal digital assistants, tablets, or the like), and so forth. A more detailed description of an embodiment of a computing system 102 is described below with respect to FIG. 9.

Game Application

The user computing system 102 can execute a game application 110 based on software code stored at least in part in the application data store 106. The game application 110 may also be referred to as a videogame, a game, game code, and/or a game program. A game application 110 should be understood to include software code that a computing device 102 can use to provide a game for a user to play. A game application 110 may comprise software code that informs a computing device 102 of processor instructions to execute, but may also include data used in the playing of the game, such as data relating to constants, images, and other data structures. In the illustrated embodiment, the game application 110 includes a game engine 112, game data 114, game state information 116, and a tutorial module 120.

In some embodiments, the user computing system 102 is capable of executing a game application 110, which may be stored and/or executed in a distributed environment. For example, the user computing system 102 may execute a portion of a game and a network-based computing system, may execute another portion of the game. For instance, the game may be a massively multiplayer online role-playing game (MMORPG) that includes a client portion executed by the user computing system 102 and a server portion executed by one or more application host systems 132.

Game Engine

The game engine 112 can be configured to execute aspects of the operation of the game application 110 within the computing device 100. Execution of aspects of gameplay within a game application can be based, at least in part, on the user input received, the game data 114, and game state information 116. The game data 114 can include game rules, prerecorded motion capture poses/paths, environmental settings, constraints, skeleton models, route information, and/or other game application information.

The game engine 112 can execute gameplay within the game according to the game rules. Examples of game rules can include rules for scoring, possible inputs, actions/events, movement in response to inputs, and the like. Other components can control what inputs are accepted and how the game progresses, and other aspects of gameplay. The game engine 112 can receive the user inputs and determine in-game events, such as actions, jumps, runs, throws, attacks, and other events appropriate for the game application 110. During runtime operation, the game engine 112 can read in game data 114 and game state information 116 to determine the appropriate in-game events.

In one example, after the game engine 112 determines character events, the character events can be conveyed to a movement engine that can determine the appropriate motions the characters should make in response to the events and passes those motions on to a physics engine. The physics engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which generates a new frame for display to the user. The process can repeated for rendering each frame during execution of the game application, and may occur multiple times a second. Though the process has been described in the context of a character, the process can be applied to any process for processing events and rendering the output for display to a user during run-time of the game application.

Game Data

The game data 114 can include game rules, prerecorded motion capture poses/paths, environmental settings, environmental objects, constraints, skeleton models, tutorial information, route information, and/or other game application information. At least a portion of the game data 114 can be stored in the application data store 106. In some embodiments, a portion of the game data 114 may be received and/or stored remotely, such as in a remote data store (not shown) associated with the interactive computing system 130. In such embodiments, game data may be received during runtime of the game application.

Game State Information

During runtime, the game application 110 can store game state information 116, which can include a game state, character states, environment states, scene object storage, route information and/or other information associated with a runtime state of the game application 110. For example, the game state information 116 can identify the state of the game application 110 at a specific point in time, such as a character position, character orientation, character action, game level attributes, and other information contributing to a state of the game application. The game state information can include dynamic state information that continually changes, such as character movement positions, and static state information, such as the identification of a game level within the game. In some embodiments, at least a portion of the game state information can be updated on a periodic basis, such as multiple times per second. In some embodiments, the game state information can be updated on an event-based basis.

Tutorial Module

The tutorial module 120 can perform various functions to provide tutorial information to the user within the game application 110 and can operate during runtime of the game application 110. In some embodiments, the tutorial module 120 can communicate with and receive tutorial information from the interactive computing system 130 (for example, from a tutorial engine 140 implemented on the interactive computing system 130). In such embodiments, the tutorial module 120 can dynamically provide tutorial information to the user within the game application 110 based on the information received from the interactive computing system 130 during runtime. Functions of the tutorial module 120 can include processing received tutorial information such that it can be displayed within the game environment. Various aspects of the operation of tutorial engine 120 are described in further detail below. In some embodiments, the tutorial module 120 can implement some or all of the functions of the tutorial engine 140.

Interactive Computing System

The interactive computing system 130 can include one or more application host systems 132 and a tutorial data store 134. The interactive computing system 130 may include one or more computing systems configured to execute a portion of the game application 110. In some embodiments, the one or more application host systems 132 can include one or more computing devices, such as servers and databases that may host and/or execute a portion of one or more instances of the game application 110. In certain embodiments, instead of or in addition to executing a portion of the game application 110, the application host systems 132 may execute another application, which may complement and/or interact with the application 110 during execution of an instance of the application 110, such as the tutorial engine 140.

Application Host System

The interactive computing system 130 may enable multiple users or computing systems to access a portion of the game application 110 executed or hosted by the application host system 132. The interactive computing system 130 can include a tutorial engine 140. In some embodiments, the host application system 132 may execute a hosting system for executing various aspects of a game environment. For example, in one embodiment, the game application 110 can record the location and/or status of characters within the game environment. In some embodiments, the game application 110 may be a single player game in which the application host system 132 may provide additional functionality when communicating with the instance of the game application 110. In some embodiments, the application host system 132 can provide a dedicated hosting service for hosting multiplayer game instances or facilitate the creation of game instances hosted by user computing devices. In some embodiments, the host application system 132 can provide a lobby or other environment for users to virtually interact with one another.

Tutorial Engine

The tutorial engine 140 can provide tutorial functionality for the game application 110. In some embodiments, the tutorial engine 140 can be configured to compile and aggregate user historical information from a plurality of users of the game application 110 to construct a game state model 144 categorizing actions performed by characters during various game states encountered over the course of gameplay. The user historical information can be gathered and aggregated from a plurality of computing systems 102. In some embodiments, the user historical information can be gathered from computing systems 102 during operation of the game application 110. In addition, the tutorial engine 140 may gather and aggregate historical information for individual users to construct individual character models 142.

In some embodiments, the character models 142 and/or game state models 144 can be generated using machine learning algorithms. The machine learning algorithms can be configured to adaptively develop and update the models over time based on input received by the tutorial engine 140. Generation and application of the character models 142 and/or game state models 144 will be described in further detail below.

Some examples of machine learning algorithms that can be used to generate and update the character models 142 and/or the game state models 144 can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

The tutorial engine 140 can be configured to generate and display tutorial information to the user via the game application 110, using a recommendation engine 146. In some embodiments, a game application 110 may include game environments having a plurality of possible game states. The tutorial engine 140 may return tutorial information for a current game state or probable future game state of the game environment, based on the game state model 144 and/or character model 142. The tutorial information can be used by the tutorial module 120 to display tutorial information to the user. Aspects of the operation of the tutorial engine 140 are discussed in more detail below.

Tutorial Data Store

The interactive computing system 130 can include one or more tutorial data stores 134 that are configured to store tutorial information associated with game application 110 hosted by the interactive computing system 130 and/or the application host systems 132. For example, the tutorial data store may contain information on how to perform various moves in the game application 110. In some embodiments, the tutorial data store 134 can include character models 142 and game state models 144 associated with the game application 110 that is generated, aggregated, and maintained by the tutorial engine module 140.

Network

The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

Tutorial Display in Response to Game States

Figure 2A:
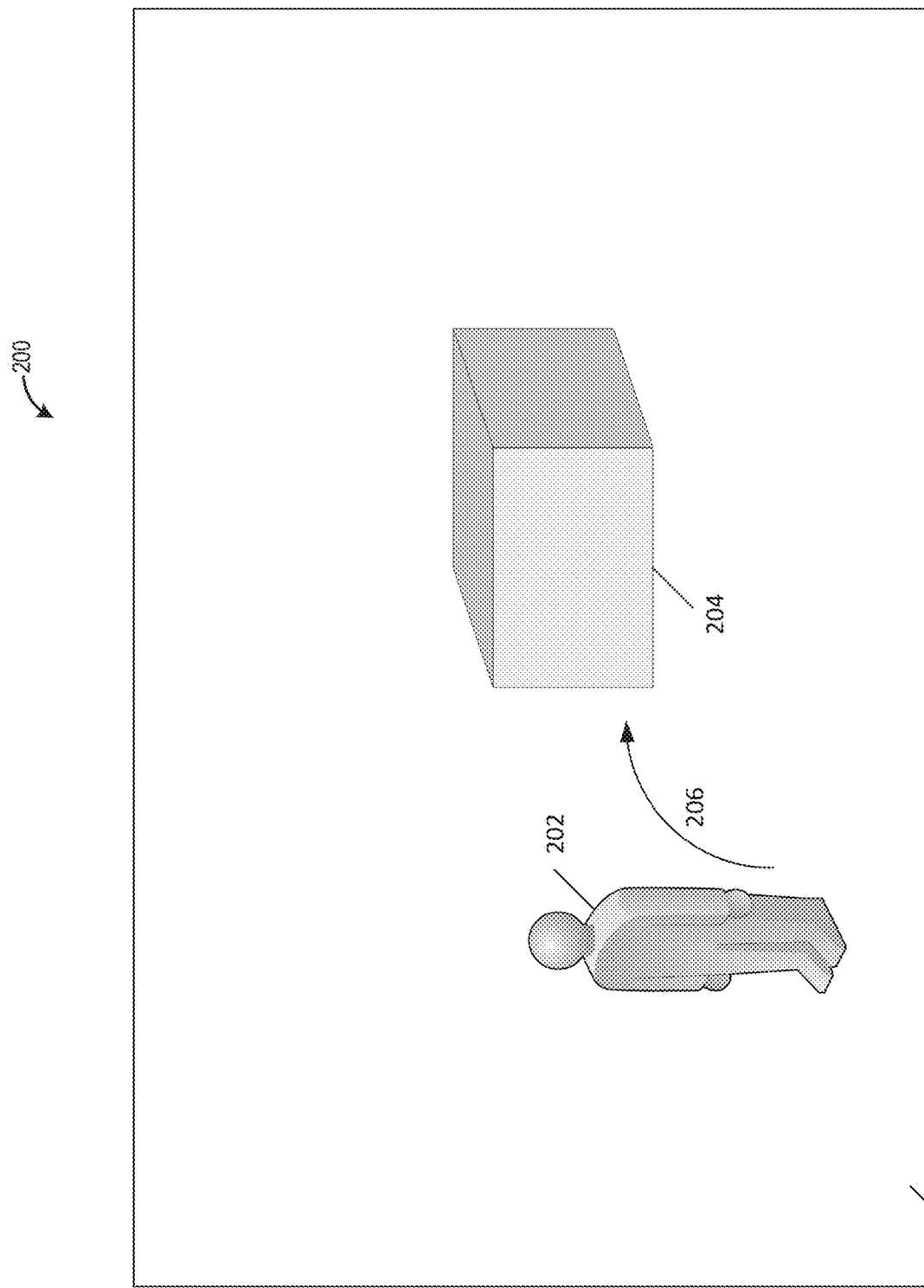
FIGS. 2A and 2B illustrate embodiments of a user interface illustrating an example of a game environment with tutorial information.
Figure 2B:
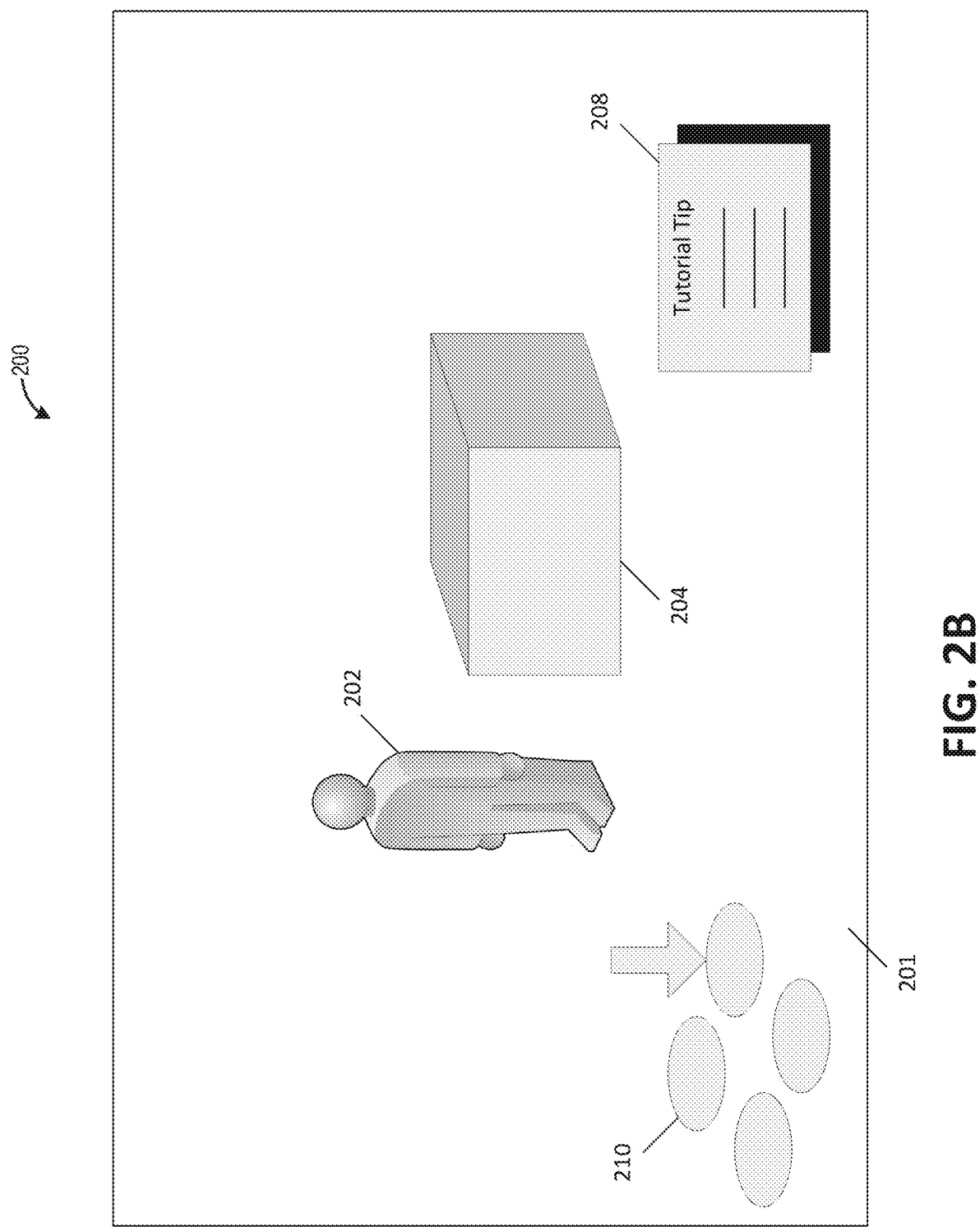

FIGS. 2A and 2B illustrate embodiments of a user interface 200 that may be used to display a game environment with tutorial information. User interface 200 may display a game environment 201 containing a character, object, or other type of entity 202 (hereinafter, referred to as character 202) associated with a game application 110 that may be controlled by the user using one or more control elements (for example, one or more buttons, a control pad, and/or the like). For example, in some embodiments, a control pad may be used by the user to navigate the character 202 through a two or three-dimensional environment, while one or more buttons may be used to allow the user to instruct the character to perform various actions (for example, punch, kick, or jump).

In some embodiments, the user may control the character 202 in order to interact with one or more objects 204. In some embodiments, object 204 may correspond to a portion of the game environment, a static or interactive object in the game environment, another character controlled by the user, another character controlled by a different user, and/or the like. In some embodiments, object 204 may correspond to multiple objects or characters.

As illustrated in FIG. 2A, the user may control the movement or actions of the character 202. For example, the player may direct the character 202 to move along a path 206 towards the object 204. As the character 202 is moved by the user towards the object 204, a game state may be detected. A game state may correspond to a current status of character 202, a location of the character 202 relative to object 204, a level of interaction between the character 202 relative to object 204 (for example, if the character 202 is holding the object 204), a combination thereof, and/or the like. In some embodiments, the current game state of the game is reflected in game state information 116, illustrated in FIG. 1.

FIG. 2B illustrates an example of tutorial information that may be displayed in response to the detection of a gameplay state. In the illustrated embodiment, a game state is detected in response to the character 202 moving within a defined proximity of the object 204. In response to the detection of the game state, the game may be configured to communicate intelligent tutorial information to the user through the tutorial module based on the user's current gameplay state, in order to provide the user with instructions associated with moves that may be performed in the selected game state. For example, when the character 202 is moved to be within a defined proximity of the object 204, tutorial information may be communicated to the user that instructs the user on how to perform certain moves on the object 204 (such as, for example, instructing the character 202 to pick up the object 204).

In some embodiments, the tutorial information may comprise textual interface information 208, such as a text box, overlaid on the user interface 200, wherein the textual interface information 208 can display information informing the user of a particular move (for example, a move that causes the character 202 to lift and throw the object 204) and/or how to perform the move. In some embodiments, the tutorial information may comprise one or more graphical elements 210 instructing the user on how to perform the move using one or more control elements of an input device. For example, graphical elements 210 can comprise one or more images or animations corresponding to buttons on an input device used by the user, with one or more indicators (such as arrows) indicating to the user which buttons or combination of buttons that need to be pressed by the user in order to perform the move in the game application.

In some embodiments, the user may play the game using an input device or controller (not shown) having some form of haptic feedback. In some embodiments, the tutorial information may comprise instructions that to cause one or more control elements, (such as, one or more buttons on a controller) to vibrate or move, thereby providing haptic instructions for the user. The haptic instructions can help to illustrate to the user which control elements (such as buttons or combination of buttons) to manipulate in order to perform the move associated with the tutorial information. This can help the user to more easily perform the move during gameplay. In some embodiments, haptic feedback may be provided in lieu of or in addition to textual interface elements 208 and/or graphical elements 210.

Figure 3:
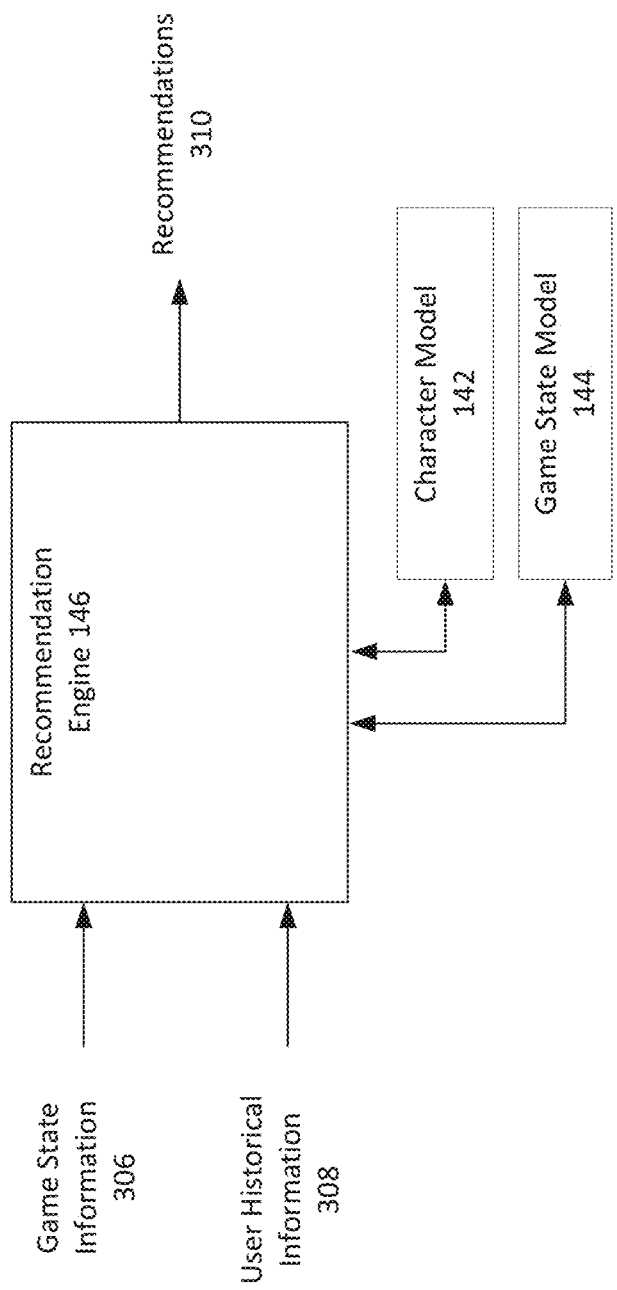
FIG. 3 illustrates an embodiment of a recommendation engine.

FIG. 3 illustrates an embodiment of a recommendation engine. In order to determine what tutorial information to present to the user, the recommendation engine 146 may be used to generate one or more recommendations, based at least in part on the current game state. In some embodiments, the recommendation engine 146 includes or has access to a character model 142 and/or a game state model 144.

The tutorial recommendation engine 146 can be configured to receive game state information 306, reflecting a current game state of the user of a game application 110. The game state information 306 may be used in conjunction with the character model 142 and game state model 144 to determine one or more recommendations 310. For example, for a given game state indicated by game state information 306, the game state model 144 can be used to determine which moves are associated with the identified game state and which moves can be recommended in response to the identified game state. The recommendation engine can determine which of the moves associated with the game state to be recommended to the user, based on the character model 142. In some embodiments, the recommendations 301 may include tutorial information that includes instructions for performing the moves by the user.

In some embodiments, the recommendation engine 146 may also receive user historical data 308. User historical information 308 may comprise information collected on the user during the course of gameplay that is not a part of the character model 302. For example, the user historical information 308 may comprise information collected as the user is playing the game, and may include game states encountered by the character, moves performed by the user, and/or the like. In some embodiments, as user historical information 308 is collected, it may be used to update the character model 302.

Character Model

A character model 142 may be generated for each user. The character model can be based on various user attributes, such as, for example a user's historical performance in the game application 110, a user skill level, a behavioral profile, played time, and other attributes associated with the user. In some embodiments, the character model 142 is associated with a particular user, a particular user account, a particular character controlled by the user (for example, a particular saved game or character slot associated with the user), and/or the like. For example, in some embodiments, the character model may correspond to a user account associated with a plurality of games played by the user, including a current game for which tutorial information may be provided, as well as other games played by the user. In some embodiments, the character model may be based upon, in addition to gameplay-related attributes associated with a particular game, other attributes, such as monetary spending associated with one or more games, other games played, and/or the like. Additionally, the user profile information may include social information (for example, number of friends, number of friends online, and the like), system information (for example, gameplay device, device model, network connection parameters, and the like), general account information (for example, demographic information, games owned, achievement information, account rank, virtual currency balances, and the like), and/or other information associated with the user.

The character model 142 may track historical data, which can include moves the user has historically performed in response to encountering different game states. The historical data may be used to determine the type of custom tutorial information that will be presented to the user. For example, if the user has historically been able to perform a move successfully, then there may be no need to provide the user with tutorial information for that particular move. On the other hand, if the user consistently does not perform a certain move that is commonly performed in response to a certain game state, this may be indicative of the user not being aware of the move or having trouble performing the move. In such cases, the tutorial engine can provide tutorial information to the user, which provides the user with additional guidance on how to perform the move when the game state is encountered.

In some embodiments, the character model 142 may also track what tutorial information has been previously provided to the user. For example, if a user consistently declines to perform a particular move despite being presented with tutorial information containing guidance on that move, this may be indicative of the user affirmatively deciding that they do not wish to perform the move. As such, the tutorial system can determine based on the historical data to not continue to provide tutorial information for that move to the user.

In some embodiments, the character model 142 can be generated by the tutorial engine 140 using machine learning algorithms. The machine learning algorithms can be configured to adaptively develop and update character models 142 based on information received by the tutorial engine 140, which may include input data sets, such as example data or historical data, along with one or more desired outcome criteria. Some data that may be used by the machine learning algorithms to generate and update a character model 142 may include a user's historical performance data, a user skill level, a behavioral profile, a user's played time, and other inputs associated with a user. The character model 142 can be configured to output an identification of recommended moves for the user along with the type of tutorial information to provide to the user at a specific game state.

Game State Model

The game state model 144 is used to determine which moves may be recommended for an identified game state. A game state model can store moves associated with a game state. The recommendation engine can use the game state model to determine which moves to recommend for a given game state. For example, the game state model may associate moves with particular game states. Each game state can identify moves that are performed by characters within the game environment in response to the game state. In some embodiments, the game state model may be stored as a lookup table that maps each game state with one or more sets of moves that are associated with each game state.

In some embodiments, different types of users may be expected to perform different moves in response to a particular game state. For example, beginner users may consistently perform certain types of moves in a given game state, while advanced user may perform a different move in response to the same game state. When providing tutorial information to a user, it may be beneficial to provide the user with information associated with moves that are appropriate to the user's level of skill in the game. For example, a user considered to be a beginner in terms of skill may be provided tutorial information for moves deemed appropriate for a beginner. Once the user has mastered a move (for example, performing the move consistently), the user can be provided with tutorial information for more advanced moves.

In some embodiments, the game state model 144 can be generated by the tutorial engine 140 using machine learning algorithms. The machine learning algorithms can be configured to adaptively develop and update game state models 144 based on information received by the tutorial engine 140, which may include input data sets, such as example data or historical data, along with one or more desired outcome criteria. Some inputs that may be used by the machine learning algorithms to generate and update a game state model 144 may include a historical game play performance data associated with a plurality of users (such as, for example user skill levels, behavioral profiles, user in-game played time), game move information, game state information, and other inputs associated the game application. The game state model 142 can be configured to output categorizations of gameplay moves at various gameplay states within the game application.

Figure 4A:
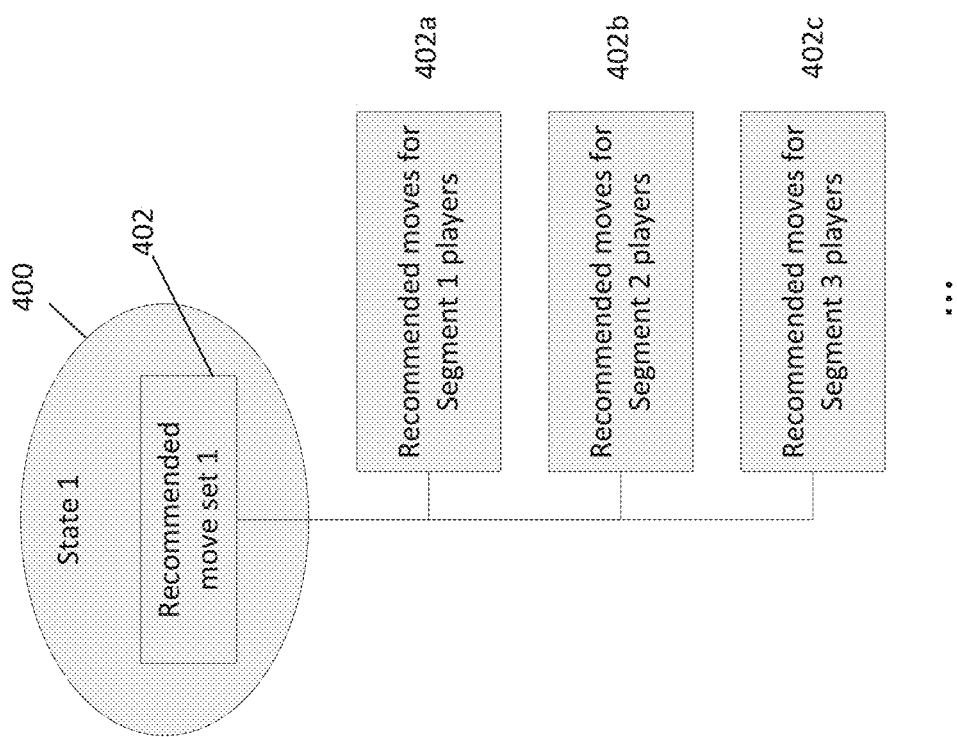
FIG. 4A illustrates an embodiment of a block diagram of a particular game state in a game state model.

FIG. 4A illustrates an embodiment of a block diagram of a particular game state in a game state model. The game state 400 may be associated with a set of recommended moves 402. In some embodiments, the recommended move set 402 may be divided into one or more recommended move subsets associated with different categories or segments of users. For example, the recommended move set 402 may be divided into a first move set 402a associated with a first user segment, a second move set 402b associated with a second user segment, and a third move set 402c associated with a third user segment. In some embodiments, each segment may correspond to different skill levels. For example, the first, second, and third segments may correspond to the user skill levels of "beginner", "intermediate", and "advanced", respectively. In some embodiments, users may be divided into segments in other ways (for example, based upon gameplay behavior, spending habits, play time, and/or the like).

Segments of users may be determined using one or more user attributes. These may include user score, user played time, user win-loss ratio, user performance in tournaments, and/or the like. For example, a user that has played the game for a long time may be inferred to have a higher skill level than a user that only recently started playing the game. A user with a higher win-loss ratio in online matches may also be inferred to have a higher skill level than a user with a lower win-loss ratio. In some embodiments, segments can be defined based on other factors. For example, a first segment may correspond to users who tend to play aggressively, while a second segment may correspond to users to typically adopt a more defensive gameplay strategy. In some embodiments, segments may be defined based on a combination of different factors.

The moves associated with each set, such as move set 402, can be determined by aggregating historical information from a plurality of users. As different users play the game, the tutorial engine can determine which game states are encountered and which moves the users perform at various game states. If a move is determined to be commonly performed in response to a particular game state 400 (for example, performed at a rate above a threshold level), the move may be included in the set of moves 402 associated with the game state. In some embodiments, rates at which moves are performed in response to different game states may be tracked separately for different segments of users. For example, a first move may be commonly performed by users of a first segment (for example, the "beginner" segment) in response to the game state 400, but by not users associated with other segments (for example, the "intermediate" and "advanced" segments). As such, the first move may be associated with the set of moves 402a associated with the first segment. In some embodiments, which moves are included in the set of moves 402 may also be based on the probable results of performing the move, based on the aggregated historical information. For example, if the performance of a particular move often leads to an undesirable result for the user (for example, the character being controlled by the user taking damage), it may not be included in the set of moves 402, even if the move would otherwise be associated with the game state 400.

By associating moves with game states based on the actual gameplay history of users of the game, the game state model is able to reflect how different types of users actually play the game. The moves that are commonly performed in response to certain game states may change as new strategies are developed for playing the game. In some embodiments, analyzing a rate at which a move is performed in response to a game state may be restricted by time period (for example, over the past month or the past year), allowing the game state model to more quickly respond to changes to the gameplay habits and strategies of users of the game.

In some embodiments, at least a portion of moves associated with a game state can be pre-defined. For example, the developer may determine that a particular move should be recommended for a particular game state to one or more segments of users. As such, the move may be included as part of a set of recommended moves for a specific game state.

In some embodiments, the game state model may be adjusted based upon one or more goals for the tutorial engine to improve one or more metrics for users of the game. For example, the goal may be to increase user retention and engagement (for example, increase the amount of time the user plays the game). In some embodiments, a goal may be directed to other metrics associated with the user (for example, increase a user skill level when playing the game, increase user spending on the game, and/or the like). In some embodiments, one or more goals for the tutorial engine may be changed, depending on the priorities and needs of a developer or users.

In some embodiments, the game state model can be trained based upon user feedback, in order to optimize the game state model to better direct towards one or more desired goals. For example, how users react to being presented with tutorial information on various moves may be recorded, and used to determine changes to be made to the game state model. Certain types of user feedback may indicate an effect that displayed tutorial information has on one or more user metrics. For example, if users of certain segments are found to have trouble performing a particular move and tend to become frustrated and play less when recommended that move repeatedly, the game state model may be updated to be less likely to recommend the move to users of those segments. On the other hand, if users of certain segments are found to spend more time playing when are able to perform a particular move, the game state model may be updated to recommend tutorial information for that move more often, in order to help the users learn the move.

In some embodiments, user feedback may comprise recording a user's actions when the user is presented with tutorial information. For example, various observations such as whether the user attempted to perform the move associated with the tutorial information, whether the user was successful in performing the move, subsequent user gameplay performance or behavior, subsequent user play time, and/or the like. These observations can be used to determine whether certain types of tutorial information had a positive or negative effect on the user with regards to one or more desired goals, allowing the game state model to be adjusted accordingly.

Game State Relationships

Figure 4B:
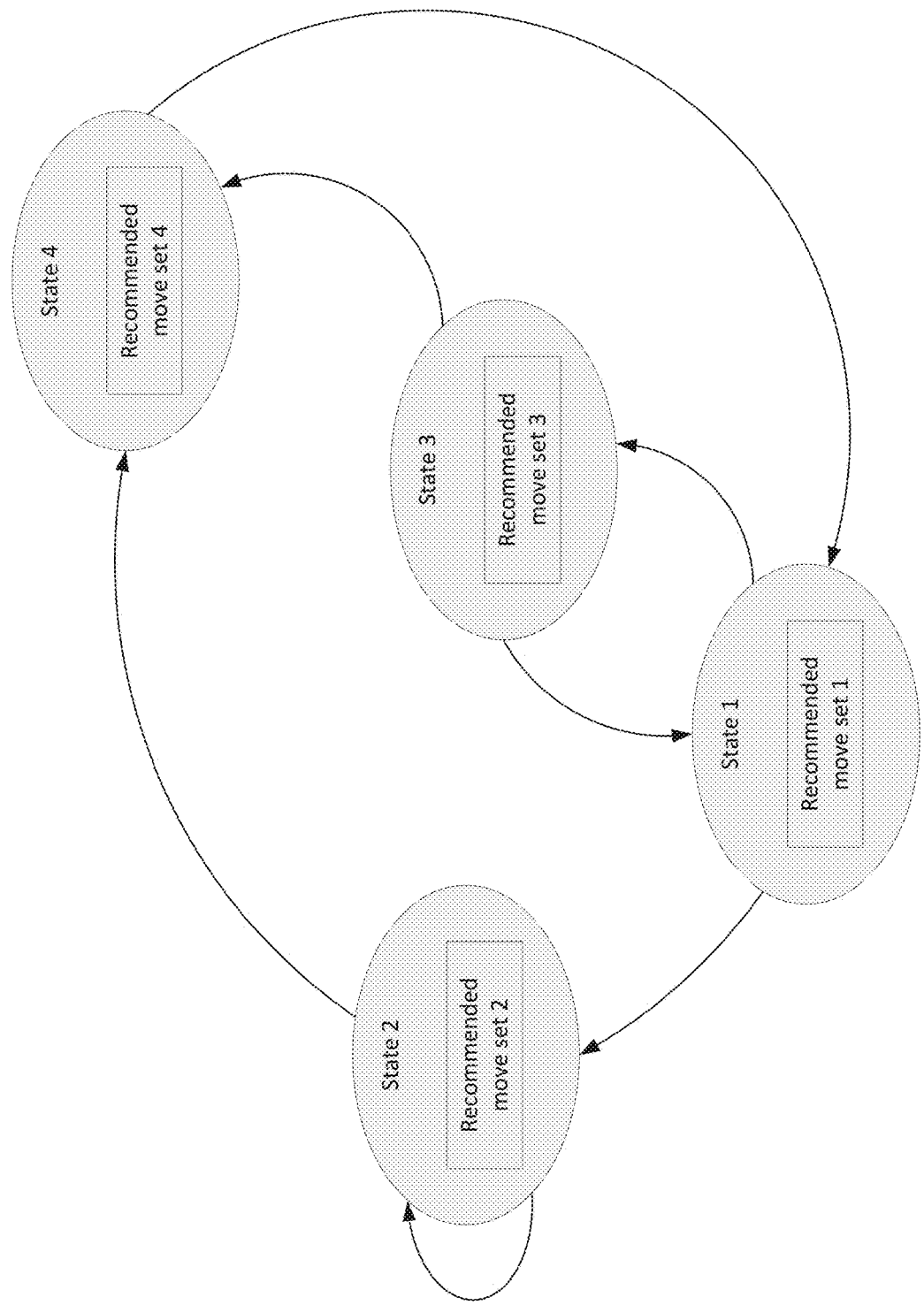
FIG. 4B illustrates an embodiment of a state diagram associated with a game state model.

In some embodiments, a game state in the game state model may be associated with one or more additional game states. FIG. 4B illustrates an embodiment of a state diagram associated with a game state model. As illustrated, each game state may be associated with one or more additional game states, each arrow illustrates a possible transition from the game state to the associated game state. For example, "State 1" may lead to "State 2" or "State 3", "State 2" may lead to "State 2" or "State 4", "State 3" may lead to "State 1" or "State 4", and "State 4" may lead to "State 1". In some embodiments, how the game transitions between different game states may be determined based on moves performed by the user, moves performed by other users, changes in the game environment, or combinations thereof.

In some embodiments, the game state model may reflect every possible transition between game states in the game. However, in some games, especially complex games with a large number of possible game states, it may not be possible or practical for the game state model to reflect every possible game state transition. As such, in some embodiments, game states in the game state model may only be associated with game states that are most likely to be encountered after the current game state (for example, above a probability threshold). In some embodiments, generation of a state diagram for determining relationships between game states may be determined by analyzing historical data of users of the game. For example, if user historical data indicates that a first game state typically leads to a transition to a second game state, the second game state may be related with the first game state, and so on.

Generation of the Game State Model

Figure 5:
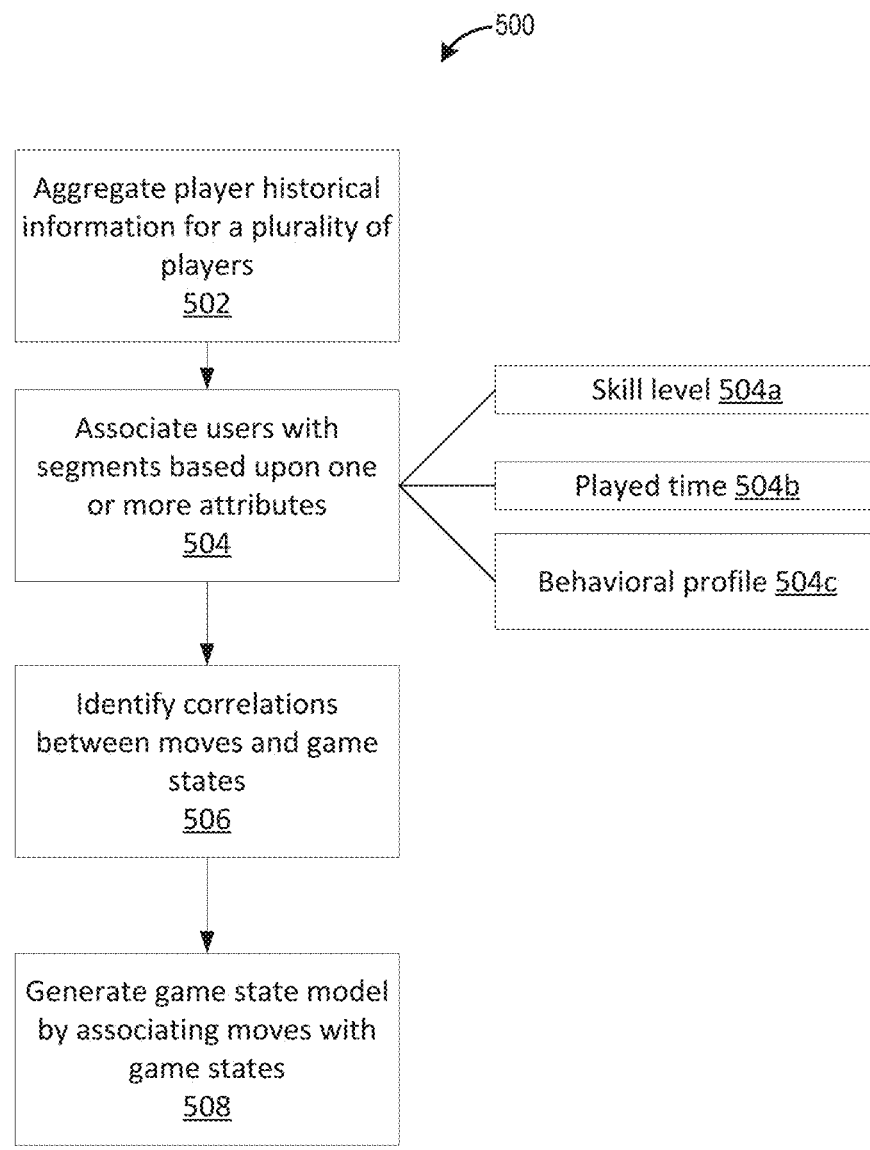
FIG. 5 illustrates a flowchart of an embodiment of a process that may be used to construct a game state model.

FIG. 5 illustrates an embodiment flowchart of a process 500 that may be used to generate a game state model. The process 500 can be implemented by any system that can analyze game state information and generate a game state model. In some embodiments, the game state model can be generated using machine learning techniques and algorithms. For example, the process 500, in whole or in part, can be implemented by a tutorial engine system 140, a tutorial module 120, an application host system 132, or other computing system. Although any number of systems, in whole or in part, can implement the process 500, to simplify discussion, the process 500 will be described with respect to particular systems.

At block 502, user historical information for a plurality of users is gathered. For example, as different users play the game application, game states encountered by the characters controlled by the users are tracked, as well as the moves performed by the characters at the game states. In addition, other types of user historical information may also be collected, such as user score, user win-loss rate, time played, user spending, and/or the like. The information can also include information provided by a game developer.

At block 504, the user accounts may be associated with one or more segments, based at least in part on one or more user attributes. User attributes may include user skill level 504a, user played time 504b, user behavioral profile 504c, and/or the like.

User skill level 504a may refer to a perceived level of skill of the user, and may be calculated as an aggregate of one or more factors. These factors can include the user's win-loss record, gameplay score, performance in tournaments or ranked play, gameplay achievements obtained, gameplay statistics (for example, damage taken or damage dealt), or any combination thereof. In some embodiments, based on a calculated user skill score, users may be categorized into one or more player segments corresponding to different skill levels (for example, "beginner", "intermediate", and "advanced").

User played time 504b may refer to an amount of time that the user has played the game. In some embodiments, user played time may be used as a factor in calculating a user skill level, wherein users who have played the game for a long time may be inferred to be more skillful at the game than users who have only played for a short time. In some embodiments, user played time 504b may refer to a total amount of time played by the user, or an amount of time played within a specified time period (for example, within the previous week).

User behavioral profile 504c may refer to behavior patterns of the user when playing the game. For example, in some embodiments, user behavioral profile may refer to a user's style of play (for example, "aggressive", "defensive", or "balanced"). In some embodiments, a user's behavioral profile may be determined based on moves or combinations of moves historically performed by the user in response to certain game states. Different styles of play may be associated with different moves or combinations of moves. In some embodiments, a user's behavioral profile may also be based on, for game applications where a user can play multiple different types of characters, which characters the user chooses to play. For example, a particular user may prefer to "warrior" type characters over "mage" type characters, or vice versa.

In addition, other types of attributes may also be used to associated a user with one or more segments (for example, user spending may be used to associate a user with a "low", "medium", or "high" spending segment). In some embodiments, attributes associated with the user may correspond to a particular game, or may correspond to multiple games played by the user (for example, a spending attribute may tracking a spending amount by the user over multiple different games).

In some embodiments, a user may be associated with multiple segments. For example, a particular user may be categorized as both having "advanced skill" and an "aggressive play style." In some embodiments, a segment may be associated with a plurality of different user attributes (for example, an "advanced aggressive" group).

At block 506, correlations between game states and the moves performed by users can be identified. In some embodiments, the identified correlations may be based at least in part upon one or more attributes associated with the users. For example, the identified correlations may be based at least in part on the segments associated with the users (by skill level, playstyle, and/or the like). Segments may be analyzed to determine which moves are most commonly performed by users associated with the segment in response to a given game state and/or are most suitable for recommendation. For example, users having an advanced level of skill may be found to often perform a particular move or combination of moves when encountering a particular game state. On the other hand, users having only an intermediate level of skill may be found to often perform a different move or combination of moves when encountering the same game state. In some embodiments, each state may be associated with one or more sets of moves corresponding to different user segments. For example, as illustrated in FIG. 4A, a particular state may be associated with a first set of moves corresponding to a first segment of users, a second set of moves corresponding to a second segment of users, etc. In some embodiments, a move may be associated with a state and user segment if the rate at which the move is performed by users associated with the segment in response to the game state meets a threshold level. In other embodiments, a designated number of most commonly performed moves (for example, top 3 moves) may be associated with the game state.

In some embodiments, correlations between game states and moves performed by users can be identified without being associated with particular segments. For example, each state may be associated with all moves performed by users in response to the particular state. In some embodiments, this may allow for one or more different segments to be created dynamically during runtime of the game application. For example, in response to one or more received criteria for defining a segment (for example, attribute values, attribute value ranges, and/or the like), users satisfying the criteria may be considered part of the segment, and the moves performed by the users in response to a particular game state may be identified and retrieved. This may allow for segments to be more customized for individual users. For example, instead of placing a user in a broad "beginner", "intermediate", or "advanced" skill level segment, a segment can be defined for the user comprising other users having skill levels similar to that of the user, potentially allowing for more targeted tutorial recommendations to be made to the user. At block 508, a game state model is generated, based at least in part on the identified correlations. In some embodiments, the game state model may further comprise one or more associations between game states, reflecting common game state transitions. In some embodiments, the game state model can comprise a lookup table that identifies game states and moves associated with the game state.

Generation of the Character Model

Figure 6:
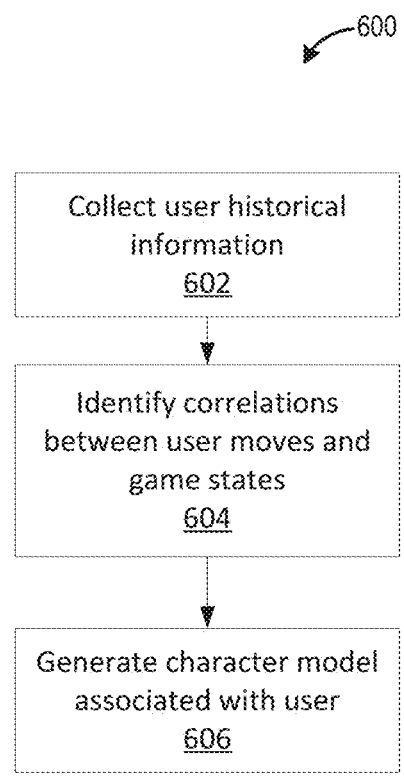
FIG. 6 illustrates a flowchart of an embodiment of a process for generating a character model.

FIG. 6 illustrates an embodiment of a flowchart of a process 600 for generating a character model. As described above, the character model is used to reflect the gameplay habits of a particular user or of a user controlling a particular character in the game application. For example, the character model may be used to determine which moves the user commonly performs in response to certain game states, what tutorial information has been previously presented to the user, and other information to help determine which tutorial information is suitable to be presented to the user. In some embodiments, the character model can be generated using machine learning techniques and algorithms. The process 600 can be implemented by any system that can analyze game state information and construct a character model. For example, the process 600, in whole or in part, can be implemented by a tutorial engine system 140, a tutorial module 120, an application host system 132, or other computing system. Although any number of systems, in whole or in part, can implement the process 600, to simplify discussion, the process 600 will be described with respect to particular systems.

At block 602, user historical information is collected. The user historical information may comprise game states encountered by the user during the course of gameplay, in addition to moves performed by the user in response to those game states. The user historical information may include the user historical information 308, illustrated in FIG. 3. In some embodiments, the user historical information may also include one or more user statistics that are tracked during the course of gameplay, such as wins or losses, kills or deaths, user score, played time, and/or the like. In some embodiments, user historical information may be collected only at certain times (for example, the user has enabled a tutorial mode, when the user is playing online, and/or the like). In other embodiments, user historical information may be collected whenever the user is playing the game.

At block 604, correlations between moves performed by the user and game states are identified. The tutorial engine can determine moves that a user is likely to perform in response to encountering a certain game state. In some embodiments, the tutorial engine can determine whether the user has previously performed a move correctly in response to encountering the game state. The tutorial engine can determine moves that the user has successfully completed a threshold number of times.

At block 606, a character model is generated for the user based upon the identified correlations. The character model may be used to track which moves the user has historically performed in response to different game states. In addition, in some embodiments, the character model may also track the user's success in performing particular moves in response to particular game states (for example, the user attempted to perform a move, but failed to successfully execute the move). As such, the user's historical gameplay behavior may be determined by analyzing the character model.

In some embodiments, generating the character model comprises categorizing the actions of the user at various game states. For example, the user may be associated with one or more segments at each game state. The tutorial engine can analyze the moves frequently performed by the user in response to a game state (as identified at block 604) compared with the moves that can be performed at a specific game state (which can be defined in the game state model). The engine can determine a segment associated with the user for specific moves at various game states relative to other users. For example, the user's behavior may be similar to an "advanced" segment user when encountering certain game states, but may more closely resemble an "intermediate" segment user for other game states. The user may be associated with different segments for moves at various game states. In some embodiments, the segment of a user may be associated with a particular player move. For example, the user may be in an "advanced" segment when performing certain game moves, but may be in an "intermediate" segment when performing other game moves.

In some embodiments, additional information may also be used to determine which segments the user may be associated with. The additional information may comprise user statistics, such as user score, user played time, user win-loss ratio, and/or the like.

In some embodiments, the character model may further comprise data on what types of tutorial information have been previously presented to the user and/or how the user has responded to the presented tutorial information. This data may be used when determining the type of tutorial information communicated to the user. For example, if tutorial information associated with a particular move and game state has been recently presented to the user, then the same tutorial information may not be presented to the user again, even if the same game state is encountered. If tutorial information associated with a particular move has been presented to the user repeatedly, but the user has consistently declined to perform the move, then it may be inferred that the user, although aware of the move, does not wish to perform the move. In which case, the tutorial information associated with the move may not be presented to the user again. In some embodiments, a quality of a user's attempt to perform a move in response to being presented with tutorial information for that move may influence whether or not tutorial information for the move may be presented to the user in the future. For example, if it is determined that the user, upon being presented with tutorial information for a particular move, attempts to perform the move but does so unsuccessfully, tutorial information associated with the move may be presented to the user again in response to a later occurrence of the game state.

Generating Tutorial Recommendations

Figure 7:
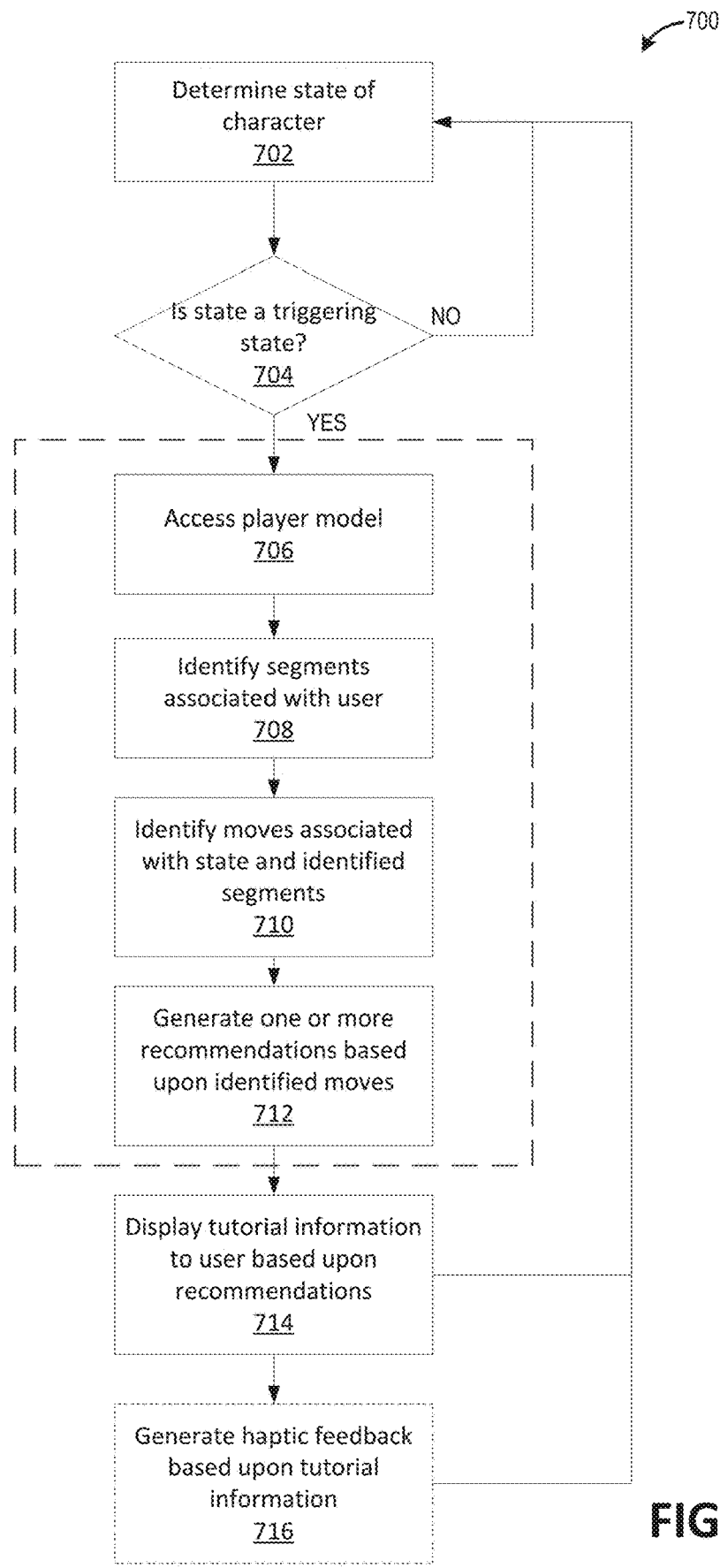
FIG. 7 illustrates a flowchart of an embodiment of a process for generating tutorial recommendations for a player.

FIG. 7 illustrates an embodiment of a flowchart of a process 700 for generating tutorial recommendations for a player. The tutorial engine can use the character model and the game state model to determine tutorial information to present to the user. For example, the tutorial engine can use the game state model to determine which moves can be recommended for a given game state, based on how other users playing the game have reacted to the game state. The tutorial engine can use the character model to determine which segment the user is associated with for the game state, and determine which moves to recommended to the user. The recommendation can be based, in part, on moves the user has been able to previously perform, tutorial information that has been previously presented to the user, and/or the like.

The process 700 can be implemented by any system that can determine tutorial information that can be provided to a user during runtime operation of a game application. For example, the process 700, in whole or in part, can be implemented by a tutorial engine system 140, a tutorial module 120, an application host system 132, or other computing system. Although any number of systems, in whole or in part, can implement the process 700, to simplify discussion, the process 700 will be described with respect to particular systems.

At block 702, a game state of a character controlled by the user is identified. As the user plays the game, the character may encounter a plurality of different game states. For example, different game states may correspond to a status of the character controlled by the user, a location of the character relative to one or more environment objects, a relationship between the character and another character or object, and/or the like. In some embodiments, the game may transition between different game states in response to the user performing moves, movement or changes of objects in the game environment, and/or the like. In some embodiments, the game state may be stored by game state information 116, illustrated in FIG. 1.

At block 704, a determination is made as to whether the identified game state is a triggering state. In some embodiments, certain game states, also referred to as triggering states, may be associated with specific moves and/or tutorial information (for example, as defined in the game state model), while other game states are not. If the identified game state is a triggering state, then the process may proceed to block 706 in order to determine one or more pieces of tutorial information associated with the game state. On the other hand, if the identified game state is not a triggering state, the process may return to block 702, where another game state of the character may be identified.

At block 706, character model data is accessed. The character model data can include historical information for the character controlled by the user. The character model can track moves the user typically performs in response to different game states. In some embodiments, the character model data may be combined with user historical information reflecting more recent user information that has not yet been integrated into the character model. In some embodiments, retrieving the character model data may comprise integrating the user historical information into the character model.

At block 708, the tutorial engine may identify one or more segments associated with the character model at the identified game state. This may be done using the character model and the game state model. For example, a comparison may be performed between the moves historically performed by the user in response to encountering the identified game state (as indicated in the character model), and the moves typically performed by different segments of users in response to the game state (as indicated in the game state model). In some embodiments, the user may be associated with a segment based on one or more user attributes tracked by the character model (for example, played time, win-loss record, user score, and/or the like). For example, the user may be associated with a segment comprising other users having similar attributes (for example, similar skill level, similar gameplay behavior, similar spending, and/or the like).

In some embodiments, one or more segments may be created dynamically during runtime of the game application based upon one or more attributes associated with the user. For example, one or more attributes associated with the user may be used to identify other users having similar attributes. Segments may be created based upon an attribute or combination of attributes associated with a user. In some embodiments, the segment may be defined based upon one or more thresholds (for example, an attribute value threshold where only other users having attribute values within a certain threshold range of those of the user are included in the segment, population thresholds, wherein a size of the segment is limited to a threshold number of users, or a combination thereof).

In some embodiments, the user may be associated with one or more pre-defined segments. For example, the user may be associated with a pre-defined "beginner" user segment, a pre-defined "intermediate" user segment, or a pre-defined "advanced" user segment. For example, one or more attributes associated with the user may be compared with one or more attributes associated with a pre-defined segment, in order to determine which segment the user should be associated with.

In some embodiments, the user may be associated with a plurality of segment s. For example, if the user is considered an "intermediate" level user at certain game states and the user may be associated with an "advanced" segment at other game states. In some embodiments, the user may be associated with a segment with a higher level of skill to help the user increase in skill level.

In some embodiments, the user may also be associated with different types of segments. For example, the user may be associated with an "intermediate" segment indicative of user skill level, as well as an "aggressive playstyle" segment indicated of gameplay style or preferences.

At block 710, one or more moves associated with the game state are identified, based at least in part on the identified segments. In some embodiments, the one or more moves may be part of a set of moves corresponding to an identified segment associated with the identified game state, as defined in the game state model. For example, the game state model may associate each game state and segment combination with a set of moves suitable to be recommended to users associated with the segment, in response to reaching the game state during the course of gameplay. In some embodiments, wherein a segment associated with the user is created dynamically during runtime, the one or more moves may be identified based upon the moves associated with users of the segment (for example, most common moves performed by users associated with the segment, in response to the particular game state).

At block 712, one or more recommendations are generated based on the identified moves. In some embodiments, certain moves may be excluded from being recommended, based upon the character model for the user (for example, moves that the user has previously performed, as indicated in the character model). In some embodiments, only moves that have been performed successfully by the user within a certain time period (such as, for example, within the last hour of gameplay time, within the last week of gameplay, at least once in the last five times the identified game state was encountered, or other time frame) are excluded, thus allowing for moves that the user may have once been able to perform but have since forgotten to be recommended.

In some embodiments, the tutorial engine presents tutorial information to the user for only one move at a time, even if multiple moves are associated with the user's current game state. In some embodiments, the tutorial engine may select a move based on the rate at which the move is performed by users in the identified user group. For example, the move with the highest rate of gameplay use by other users may be selected for recommendation. In some embodiments, a move deemed most relevant to the user is recommended, based on historical information recorded for the user (for example, as recorded in the character model). For example, if the user is associated with both the "intermediate" level user group and the "aggressive" user segments, a move that is associated with both user segments for the identified game state may be chosen for recommendation over a move only associated with one of the user groups. In some embodiments, a move that a user has attempted to perform in the past but may have not been able to successfully perform, indicating that the user may desire additional guidance on the move, may be more likely to be recommended. In some embodiments, a random move of the identified moves may be chosen. In some embodiments, the tutorial engine may provide multiple moves and the user selects the tutorial to perform. Any combination of the above techniques may be used to determine a move to be recommended.

At block 714, tutorial information based on the recommendations is presented to the user, comprising information on one or more moves and how to perform the moves. In some embodiments, the tutorial information may be displayed as an overlay on the display on which the game is displayed (for example, as illustrated in FIG. 2B). In some embodiments, the tutorial information may be displayed on a separate screen (for example, a dual screen device may display the game environment on one screen, and the tutorial information on the other screen). The tutorial information can comprise text information, graphic information, animation, or any combination thereof.

At block 716, haptic feedback may optionally be generated based on the tutorial information. In some embodiments, the user may interact with the game using an input device with haptic feedback capabilities (for example, a keyboard or controller having buttons that can vibrate or move). The tutorial information may contain data on which buttons or other input means on the input device need to be manipulated in order to perform a particular move. Instructions may be sent to the input device to cause one or more buttons on the controller to vibrate or push up, allowing the user to know which buttons or combination of buttons to press in order to perform the move associated with the tutorial information. The use of haptic feedback may allow the user to better receive information on how to perform the move without being distracted from gameplay. The haptic feedback can help train the user to perform the move. On presentation of the tutorial information (on screen or through haptic feedback), the process may then return to block 702, where a new game state of the character can be identified.

In some embodiments, blocks 706, 708, 710, and 712 may be performed by a game server separate from the computing system used by the user to play the game (hereinafter also referred to as a client system). For example, the game server may correspond to the interactive computing system 130 as illustrated in FIG. 1. The game server may comprise a tutorial engine (for example, tutorial engine 140 as illustrated in FIG. 1) which maintains the character model and the game state model. On receipt of the game state information from the client system, the game server uses the tutorial engine to generate one or more recommendations (for example, as described with relation to blocks 706, 708, 710, and 712), which are then transmitted back to the client system to be communicated to the user. In some embodiments, blocks 706, 708, 710, and 712 can be performed on the client system, without communicating with a separate game server. For example, the client system may maintain a character model and game state model for which to generate recommendations. In some embodiments, the client system may receive updates for the game state model from a game server. For example, the game server can collect and aggregate user historical data from a plurality of different users. The aggregated data may then be sent to a plurality of client systems to update the game state models maintained by each system.

Game State Pre-fetching

Figure 8:
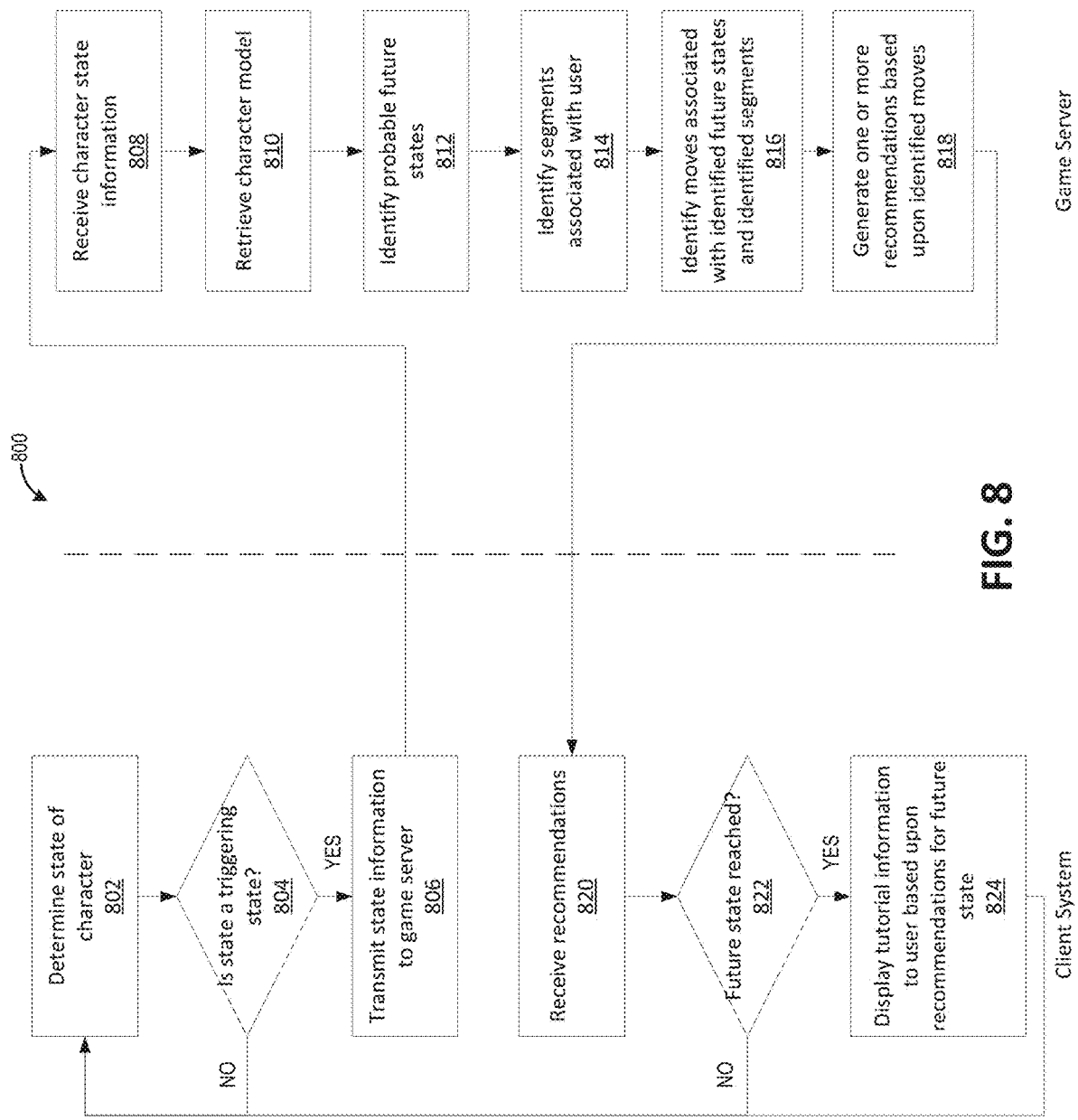
FIG. 8 illustrates a flowchart of an embodiment of a process for prefetching tutorial recommendations.

FIG. 8 illustrates an embodiment of a flowchart of a process 800 for prefetching tutorial recommendations. In fast-paced games, the state of the game may change very rapidly. In embodiments where the character model and/or game state model are stored remotely from the client system on which the user is playing the game, recommendations may not always be received quickly enough to be of use to the user. In order to ensure that tutorial information is presented to the user in a timely manner (for example, after the state is detected but before a new state is reached), state pre-fetching may be used in some embodiments to allow tutorial information that may be relevant to the user to be retrieved ahead of time, so that it can be quickly presented to the user when the relevant game states are reached. In some embodiments, state pre-fetching may be based at least in part upon one or more predictions as to what moves a user may perform or what states the user is expected to reach (for example, based upon the current game state and the character model associated with the user).

As illustrated in FIG. 4B, in some embodiments each game state may be associated with one or more game states that commonly follow the game state. When a particular game state is detected, instead of only retrieving tutorial information for that particular game state, tutorial information associated with other game states may be fetched.

The process 800 can be implemented by any system that can determine tutorial information that can be provided to a user during runtime operation of a game application. For example, the process 800, in whole or in part, can be implemented by a tutorial engine system 140, a tutorial module 120, an application host system 132, or other computing system. Although any number of systems, in whole or in part, can implement the process 800, to simplify discussion, the process 800 will be described with respect to particular systems.

At block 802, a game state of a character controlled by the user in the game application is determined. At block 804, a determination is made as to whether the game state is a triggering state. If not, the process may return to block 802, where a new game state may be determined. However, if the game state is a trigger state, the process may proceed to block 806. At block 806, game state information is transmitted to the game server. In addition, additional user information, such as collected user historical information, may also be transmitted to the game server.

At block 808, the identified game state is received at the game server. In addition, transmitted user historical information may also be received. At block 810, character model data is retrieved. The character model data comprises historical information for the user, tracking what types of moves the user typically performs in response to different game states. In some embodiments, the character model data may be combined with the received user historical information to provide an up to date picture on the behavior of the user.

At block 812, one or more future states are identified, based at least in part on the received game state. In some embodiments, each game state may be associated with one or more other games states that are likely to be reached some time following the identified game state (for example, as illustrated in FIG. 4B). These game states may have been identified based on expected changes in the game environment, moves likely to be performed by the user (for example, based upon the character model of the user), moves frequently performed by users of the game application (for example, moves performed by users of a similar segment as the user), and/or the like. One or more of these states may be identified as future states. The tutorial engine can determine future states by accessing the game state model and looking up the states associated with the identified game state. In addition, in some embodiments, each probable future state may be associated with one or more additional states, which may also be identified as probable future states.

In some embodiments, at least one future state may be identified based at least in part on historical data associated with the user (for example, as defined in the character model). For example, a user, when encountering a particular first game state, may be found to be likely to perform a move causing a particular second game state. As such, the second game state may be considered a probable future state for the user, even if it is not a probable future state for users of the game application in general. In some embodiments, the probable future states may be identified based on both the game state model and the character model. In some embodiments, probable future states may also be identified based at least in part upon one or more recommendations associated with the current game state (for example, a user presented with tutorial information for a particular move may be more likely to perform that move, potentially increasing the likelihood of reaching certain game states as a result of performing the move).

In some embodiments, the number of future states identified may be restricted or limited to a certain number. For example, an identified state may be associated with a large number of other states in the game state model. However, only a set number may be identified as future states. In some embodiments, which states are identified as future states may be based at least in part on a calculated probability that the state will be reached, based on the game state model, historical data associated with the user, and/or the like. For example, only states having a probability above a threshold level, or a top number of states based on probability, or some combination thereof, may be designated as future states.

At block 814, the user is associated with one or more segments. This may be done using the character model and the game state model, similarly to as described with regards to block 708 illustrated in FIG. 7. In some embodiments, in addition to associating the user with one or more segments with regards to the identified game state, the user may also be associated with one or more segments with regards to the identified future states.

At block 816, one or more moves identified are associated with the identified future states. The one or more moves can be based on the segments that the user is associated with. The process for identifying moves associated with each of the probable future states may be similar to that described with regards to block 710 of FIG. 7. In some embodiments, moves associated with the identified game state may also be identified.

At block 818, one or more recommendations are generated for each probable future state, based on the identified moves. The process for identifying moves associated with each of the probable future states may be similar to that described with regards to block 712 of FIG. 7. In some embodiments, one or more recommendations are also generated for the identified game state. The generated recommendations may then be transmitted from the game server to the client system.

At block 820, the client system receives the recommendations from the game server. In some embodiments, tutorial information may be displayed for the current game state, based on a received recommendation associated with the current game state (for example, similar to as described with regards to blocks 714 and 716 as illustrated in FIG. 7). At block 822, a determination is made as to whether a probable future state is reached. If not, the process may return to block 802, where a new game state is determined. However, if a future state is reached, the process may proceed to block 824.

At block 824, tutorial information based on the recommendations for the reached state is presented to the user, comprising information on one or more moves and how to perform the moves. In some embodiments, presenting the tutorial information may comprise instructions for generating haptic feedback at a controller or other input device used by the user.

Overview of Computing Device

Figure 9:
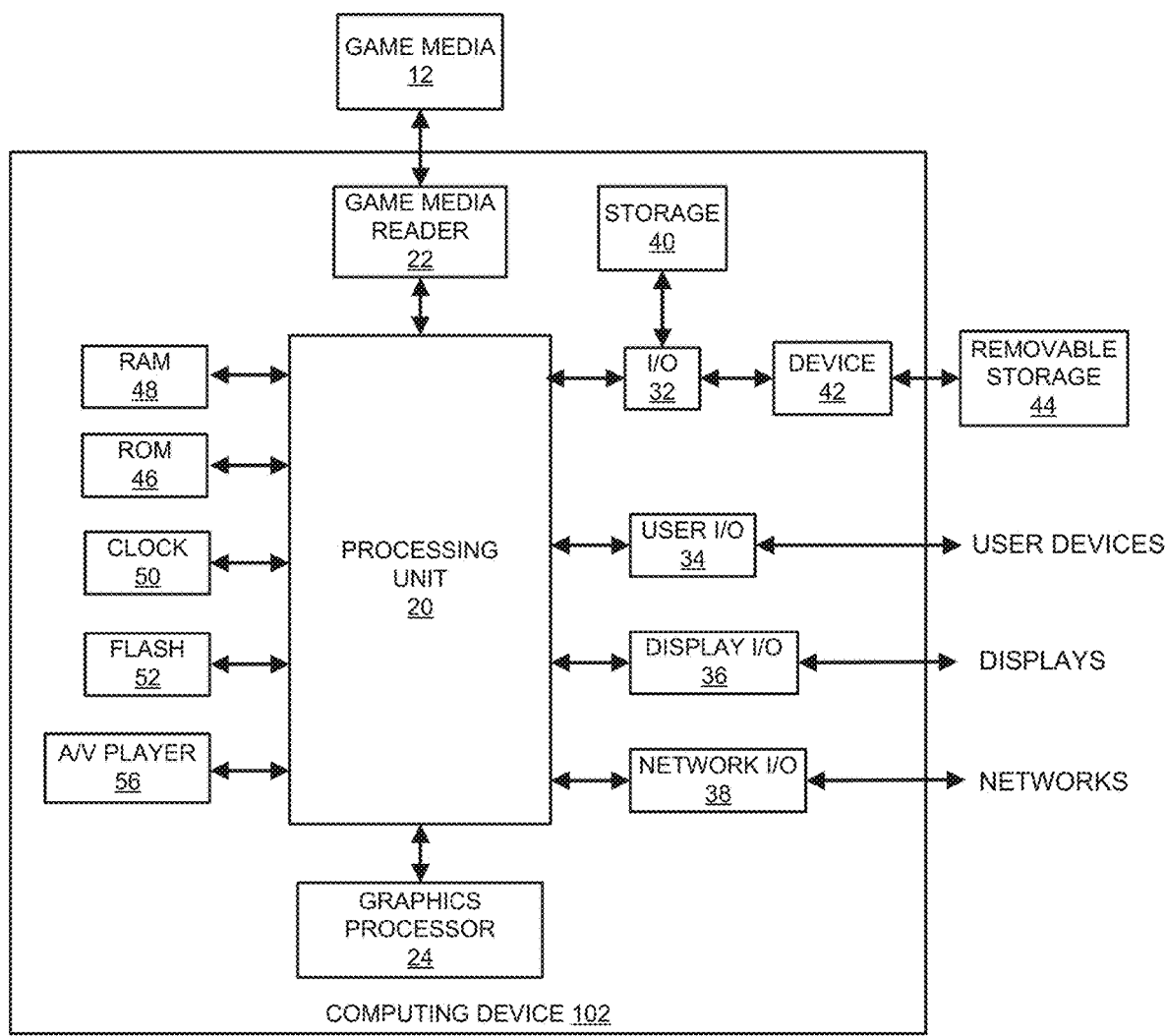
FIG. 9 is a block diagram that illustrates an embodiment of a computing system.

FIG. 9 illustrates an embodiment of computing device 102 according to the present disclosure. Other variations of the computing device 102 may be substituted for the examples explicitly presented herein, such as removing or adding components to the computing device 102. The computing device 102 may include a game device, a smart phone, a tablet, a personal computer, a laptop, a smart television, a car console display, a server, and the like. As shown, the computing device 102 includes a processing unit 20 that interacts with other components of the computing device 102 and also external components to computing device 102. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 102 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 102 may include a discrete graphics processor 24 that is separate from the processing unit 20. In some such cases, the graphics processor 24 may have separate RAM from the processing unit 20. Computing device 102 might be a handheld video game device, a dedicated game console computing system, a general-purpose laptop or desktop computer, a smart phone, a tablet, a car console, or other suitable system.

Computing device 102 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 102. Processing unit 20 can communicate through I/O 32 to store data, such as game state data and any shared data files. In addition to storage 40 and removable storage media 44, computing device 102 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 102 on a display device, such as graphics, user interfaces, video, and/or other visual content. Computing device 102 may comprise one or more integrated displays configured to receive display output signals produced by display I/O 36. According to some embodiments, display output signals produced by display I/O 36 may also be output to one or more display devices external to computing device 102, such a display 16.

The computing device 102 can also include other features that may be used with a game, such as a clock 50, flash memory 52, and other components. An audio/video player 56 might also be used to play a video sequence, such as a movie. It should be understood that other components may be provided in computing device 102 and that a person skilled in the art will appreciate other variations of computing device 102.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 102 is turned off or loses power.

As computing device 102 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
as implemented by an interactive computing system configured with specific computer-executable instructions during runtime of a game application,
receiving, from a client computing device, game state information associated with a character in a game environment of the game application, wherein the character is associated with a user playing the game application on the client computing device;
accessing a character model corresponding to the user, wherein the character model includes historical data associated with previous game commands performed by the user at one or more game states;
identifying a first game state within a game state model based, at least in part, on the game state information, wherein the first game state is associated with a plurality of game commands;
identifying a first player segment associated with the user at the first game state, wherein the identification of the first player segment is based, at least in part, on the character model, a user skill level, and the game state model, wherein the first player segment is one of a plurality of player segments, wherein each player segment corresponds to a different user skill level and each player segment is associated with a set of game commands associated with the corresponding user skill level, wherein each player segments of the plurality of player segments is associated with different game commands of the plurality of game commands at the first game state;
identifying a tutorial from a plurality of tutorials for at least one game command of the plurality of game commands associated with the first game state, wherein the tutorial for the at least one game command is identified from the set of game commands associated with the first player segment;
generating a tutorial information data package comprising instructions to implement the tutorial for performing the least one game command within the game environment; and
transmitting, to the client computing device, the tutorial information data package.

2. The computer-implemented method of claim 1, wherein the character model further comprises one or more user statistics including at least one of: user played time, user score, user level, or user win-loss ratio.

3. The computer-implemented method of claim 1, further comprising:
receiving, from the client computing device, user historical information; and
updating the character model using the received user historical information.

4. The computer-implemented method of claim 1, wherein the game state model comprises aggregated historical data associated with a plurality of users of the game application, and wherein the game state model associates game states with game commands performed by the plurality of users.

5. The computer-implemented method of claim 4, wherein a game state in the game state model is associated with one or more sets of game commands.

6. The computer-implemented method of claim 4, wherein a game state in the game state model is associated with one or more additional game states, wherein the additional game states correspond to probable game states that may be reached after the current game state.

7. The computer-implemented method of claim 1, wherein the user is associated with the first player segment based on a behavioral profile of the user.

8. The computer-implemented method of claim 1, further comprising:
- identifying one or more probable future game states based, at least in part, on the game state information;
- for each identified probable future game state of the one or more probable future game states:
  - associating the user with at least one player segment based, at least in part, on the historical data and the identified probable future game state;
  - identifying at least one game command associated with the identified probable future game state based, at least in part, on the at least one player segment associated with the user;
  - generating one or more recommendations corresponding to the identified at least one game command; and
  - transmitting, to the client computing device, the one or more recommendations associated with the identified probable future game state.

9. A system comprising:
- an electronic data store configured to store a game state model and a character model associated with a game application;
- a hardware processor in communication with the electronic data store, the hardware processor configured to execute specific computer-executable instructions during runtime of a game application to at least:
  - receive game state information associated with a character in a game environment of the game application from a client computing device, wherein the character is associated with a user playing the game application on the client computing device;
  - access a character model corresponding to the user, wherein the character model includes historical data associated with previous game commands performed by the user at one or more game states;
  - identify a first game state within a game state model based, at least in part, on the game state information, wherein the first game state is associated with a plurality of game commands;
  - identify a first player segment associated with the user at the first game state, wherein the identification of the first player segment is based, at least in part, on the character model, a user skill level, and the game state model, wherein the first player segment is one of a plurality of player segments, wherein each player segment corresponds to a different user skill level and each player segment is associated with a set of game commands associated with the corresponding user skill level, wherein individual player segments of the plurality of player segments are associated with different game commands of the plurality of game commands at the first game state;
  - identify a tutorial from a plurality of tutorials for at least one game command of the plurality of game commands associated with the first game state, wherein the tutorial for the at least one game command is identified from the set of game commands associated with the first player segment;
  - generate a tutorial information data package comprising instructions to implement the tutorial for performing the least one game command within the game environment; and
  - transmit the tutorial information data package to the client computing device.

10. The system of claim 9, wherein the character model further comprises one or more user statistics including at least one of: user played time, user score, user level, or user win-loss ratio.

11. The system of claim 9, wherein the game state model comprises aggregated historical data associated with a plurality of users of the game application, and wherein the game state model associates game states with game commands performed by the plurality of users.

12. The system of claim 9, wherein a game state in the game state model is associated with one or more sets of game commands.

13. The system of claim 12, wherein a game state in the game state model is associated with one or more additional game states, wherein the additional game states correspond to probable game states that may be reached after the current game state.

14. The system of claim 9, wherein the user is associated with the first player segment based on a behavioral profile of the user.

15. A non-transitory computer-readable storage medium storing computer executable instructions that, when executed by one or more computing devices, configure the one or more computing devices to perform operations comprising:
- receiving, from a client computing device, game state information associated with a character in a game environment of a game application, wherein the character is associated with a user playing the game application on the client computing device;
- accessing a character model corresponding to the user, wherein the character model includes historical data associated with previous game commands performed by the user at one or more game states;
- identifying a first game state within a game state model based, at least in part, on the game state information, wherein the first game state is associated with a plurality of game commands;
- identifying a first player segment associated with the user at the first game state, wherein the identification of the first player segment is based, at least in part, on the character model, a user skill level, and the game state model, wherein the first player segment is one of a plurality of player segments, wherein each player segment corresponds to a different user skill level and each player segment is associated with a set of game commands associated with the corresponding user skill level, wherein individual player segments of the plurality of player segments are associated with different game commands of the plurality of game commands at the first game state;
- identifying a tutorial from a plurality of tutorials for at least one game command of the plurality of game commands associated with the first game state, wherein the tutorial for the at least one game command is identified from the set of game commands associated with the first player segment;
- generating a tutorial information data package comprising instructions to implement the tutorial for performing the least one game command within the game environment; and
- transmitting, to the client computing device, the tutorial information data package during runtime of the game application.

16. The non-transitory computer-readable storage medium of claim 15, wherein the game state model comprises aggregated historical data associated with a plurality of users of the game application, and wherein the game state model associates game states with game commands performed by the plurality of users.

17. The non-transitory computer-readable storage medium of claim 16, wherein a game state in the game state model is associated with one or more sets of game commands.

18. The non-transitory computer-readable storage medium of claim 16, wherein a game state in the game state model is associated with one or more additional game states, wherein the additional game states correspond to probable game states that may be reached after the current game state.

* * * * *